United States Patent [19]

Shishido et al.

[11] Patent Number: 5,726,774
[45] Date of Patent: Mar. 10, 1998

[54] DOCUMENT READING DEVICE WITH LIGHT-SHIELDING MEMBER THAT PREVENTS A LOCAL TEMPERATURE INCREASE IN A DOCUMENT PLACING TABLE

[75] Inventors: Kazuo Shishido; Hiroyoshi Maruyama, both of Yokohama, Japan

[73] Assignee: Canon Kabushiki Kaisha, Tokyo, Japan

[21] Appl. No.: 478,678

[22] Filed: Jun. 7, 1995

[30] Foreign Application Priority Data

Jun. 17, 1994 [JP] Japan ................... 6-135789

[51] Int. Cl.$^6$ ............................................ H04N 1/04
[52] U.S. Cl. ................... 358/475; 358/474; 358/498
[58] Field of Search .................... 358/471, 474, 358/496–498, 486, 488; 355/308, 311, 282, 285, 230, 231; H04N 1/04

[56] References Cited

U.S. PATENT DOCUMENTS

| | | |
|---|---|---|
| 4,620,781 | 11/1986 | Miyamoto . |
| 4,745,466 | 5/1988 | Yoshida et al. . |
| 4,769,718 | 9/1988 | Imamura .................... 358/475 |
| 4,774,550 | 9/1988 | Igarashi ..................... 355/67 |
| 4,908,717 | 3/1990 | Natori ....................... 358/474 |
| 4,908,719 | 3/1990 | Noroyama ................. 358/498 |
| 5,198,853 | 3/1993 | Ichihara et al. ........... 355/244 |
| 5,218,463 | 6/1993 | Lianza et al. ............. 358/487 |
| 5,261,013 | 11/1993 | Murata et al. ............ 358/471 |

FOREIGN PATENT DOCUMENTS

| | | |
|---|---|---|
| 3606026 | 9/1986 | Germany . |
| 61-71762 | 4/1986 | Japan . |
| 7-248546 | 9/1995 | Japan . |

OTHER PUBLICATIONS

Patent Abstracts of Japan, vol. 5, No. 141 (E-73) [813], 5 Sep. 1981 & JP-A-56 076678 (Ricoh), 24 Jun. 1981, *abstract*.
Patent Abstracts of Japan, vol. 11, No. 399 (P-651), 26 Dec. 1987 & JP-A-62 162248 (Sharp Corp.), 18 Jul. 1987, *abstract*.

*Primary Examiner*—Kim Vu
*Attorney, Agent, or Firm*—Fitzpatrick, Cella, Harper & Scinto

[57] ABSTRACT

A document reading device for applying light to a document placed on platen glass so as to read an image formed on the document. The device is provided with a light-screen. The width of the light-screen can be changed according to the document size in such a way that it is also possible to change the amount of light which can pass through the light-screen from a light source to be applied to the platen glass. With this arrangement, a local temperature increase in the platen glass can be inhibited during sequential document-reading.

9 Claims, 4 Drawing Sheets

DOCUMENT READING DEVICE WITH LIGHT-SHIELDING MEMBER THAT PREVENTS A LOCAL TEMPERATURE INCREASE IN A DOCUMENT PLACING TABLE

BACKGROUND OF THE INVENTION

1. Field of the Invention

The present invention relates to a document reading device for use in copying machines, scanners or the like. More particularly, the invention relates to a document reading device provided with an automatic document feeder for automatically feeding and transferring a document onto a document placing table so as to read an image formed on the document while transferring it.

2. Description of the Related Art

Copying machines provided with an automatic document feeder are conventionally known. Two types of methods are available to apply light to a document placed on a document placing table. In one type of method, a document is exposed to light by moving a light source and a mirror. In the other type, documents are continuously fed and transferred to the document placing table without stoppage by an automatic document feeder in the state in which the light source is stationary in a predetermined position of the document placing table (sequential document-reading method). Some copying machines use both methods.

The latter method is more advantageous since it does not necessitate moving the light source and the mirror, thus enabling higher speed reading of documents and also inhibiting vibrations caused during reading.

In copying machines of the conventional type, it is necessary that a large quantity of light be emitted from a light source to allow documents to be copied to be exposed to the light, which entails that a considerably large amount of heat, together with the light, will be emitted from the light source.

According to the method of performing exposure by moving the light source, the light is uniformly applied to the document placing table. As a result, each of the respective parts of the table is exposed to light only for a short period of time.

However, according to the sequential document-reading method, since the documents are illuminated with the light source stationed in a predetermined position, the light is concentrated on only one part of the table, thereby causing a local temperature increase in the table adjacent to the light source. If the document placing table is formed of glass or the like, cracks may occur in the document placing table due to high temperatures after a long period of performing sequential document-reading.

Additionally, the above-mentioned problem also causes thermal distortion in the various composing members and brings about discoloration to a white colored member which is used for covering the top portion of the document placing table, such as platen glass or the like, and also causes a deterioration in the durability of electric parts, such as circuit parts and the like.

SUMMARY OF THE INVENTION

Accordingly, in view of the above-described problems, an object of the present invention is to provide a document reading device which prevents a local temperature increase in a document placing table so as to solve the various types of problems inherent in conventional devices.

Another object of the present invention is to provide a document reading device which comprises a document placing table, a light source for illuminating a document placed on the document placing table, and light-screening means for screening light travelling to the document placing table from the light source, such that the width of the light-screening means along which the light is screened can be changed according to the document size.

A further object of the present invention is to provide a document reading device which comprises a document placing table, a light source for illuminating a document placed on the document placing table, and heat-transfer inhibiting means for inhibiting heat from being transferred to the document placing table from the light source, such that the width of the heat-transfer inhibiting means along which heat transfer is inhibited can be changed according to the document size.

Further objects, features and advantages of the present invention will become apparent from the following description of the preferred embodiments with reference to the attached drawings.

DETAILED DESCRIPTION OF THE PREFERRED EMBODIMENTS

Figure 1:
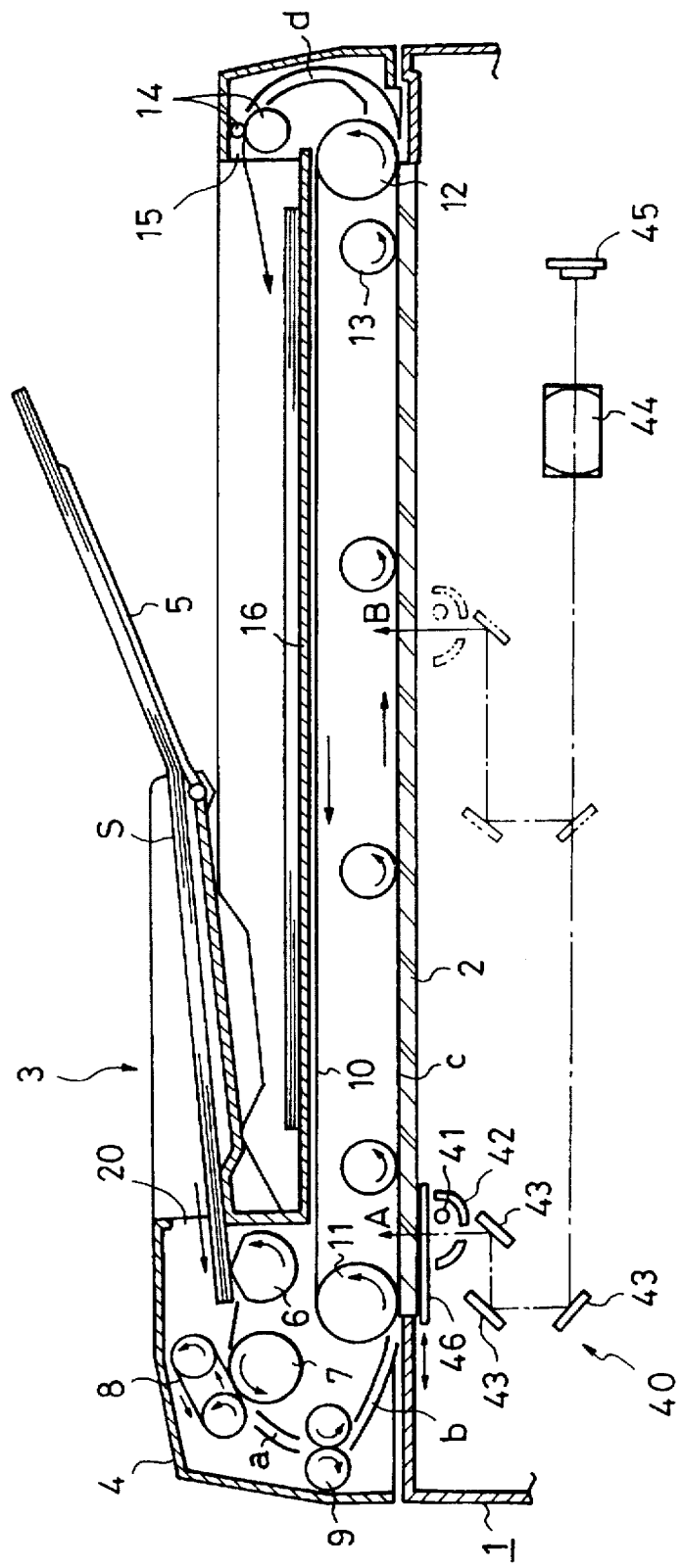
FIG. 1 is a cross sectional view illustrative of the upper portion of an image forming apparatus provided with an image reading device according to a first embodiment of the present invention.
Figure 2:
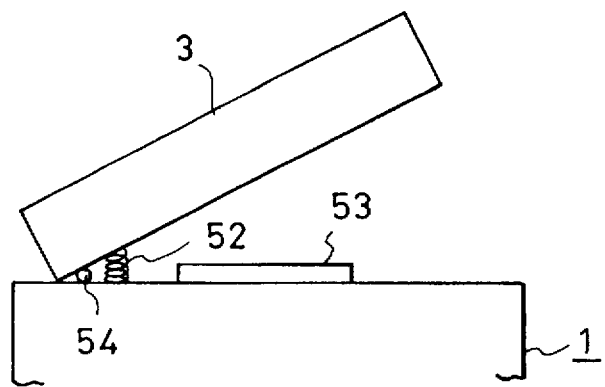
FIG. 2 is a side view illustrative of the upper portion of the image forming apparatus in the state in which an automatic document feeder of the image reading device according to the first embodiment of the present invention is opened.
Figure 3:
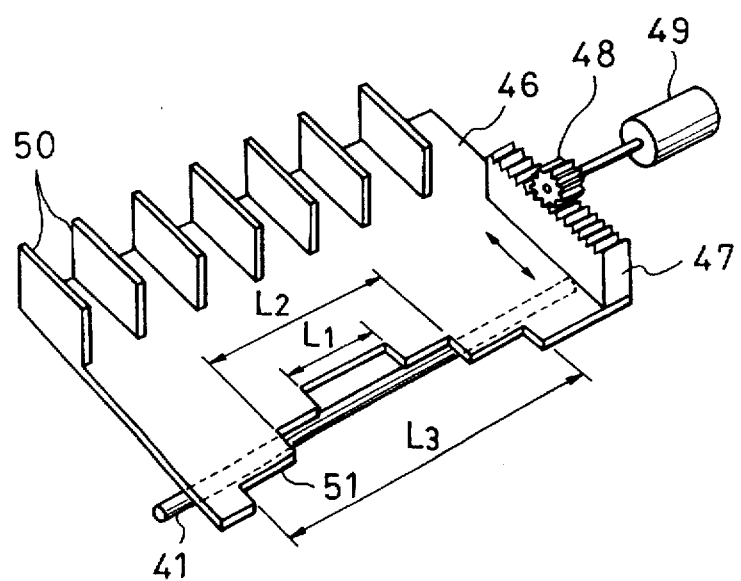
FIG. 3 is a perspective view illustrative of a drive mechanism of a heat-radiating plate for use in the image reading device according to the first embodiment of the present invention.

Embodiments of the present invention will now be described with reference to the accompanying drawings.
First Embodiment FIG. 1 is a sectional view illustrative of the upper portion of an image forming apparatus equipped with an image reading device according to a first embodiment of the present invention. FIG. 2 is a side view illustrative of the upper portion of the image forming apparatus when an automatic document feeder is opened. FIG. 3 is a perspective view illustrative of a drive mechanism of a heat-radiating plate.

Referring to FIG. 1, an image forming apparatus 1 comprises an image reader 40 formed in the upper portion of the main body of the apparatus 1 and an automatic document feeder 3 mounted on the main body of the apparatus 1. The image reader 40 and the automatic document feeder 3 constitute the document reading device of the present invention.

The image forming apparatus 1 further comprises platen glass (document placing table) 2 disposed on the top surface of the apparatus 1, an exterior cover (main cover) 4 for the automatic document feeder 3, and a document tray 5. Sheet documents S are mounted on the tray 5, the forward ends of the documents S being inserted into a document inserting portion 20.

The operation of the image forming apparatus 1 constructed as described above will now be explained. A semispherical paper feed roller 6 is driven based on a document feeding start signal so as to allow a feeding force to act upon the sheet document S placed lowermost on the document tray 5. The documents S on the tray 5 are thus separated and fed one by one into the automatic document feeder 3 through a separating and feeding portion comprising a paper feed roller 7 and a document-separating turn belt 8.

The sheet documents S which have thus been separated and fed one by one pass through a sheet path a, a pair of register rollers 9 and another sheet path b so as to be transferred between the platen glass 2 and a document-feeding turn belt 10.

A pair of register rollers 9 serve the two functions of: straightening skewed documents S by temporarily holding the edge of the document S by a nip portion provided for the rollers 9, such documents S having been skewed while being separated and fed one by one by the separating and feeding portion comprising the feed roller 7 and the turn belt 8; and providing timing for feeding the sheet document S to the platen glass 2.

The document-feeding turn belt 10, which is used for advancing the sheet document S on the platen glass 2, is fit around and between a belt drive roller 11 and a turn roller 12 which are respectively located at both ends of the platen glass 2. The lower portion of the belt 10 is pressed onto the top surface of the platen glass 2 by a plurality of pressing rollers 13.

Since the belt 10 is turned counterclockwise in the direction indicated by the arrows in FIG. 1, the sheet document S, which has been fed between the platen glass 2 and the belt 10 through the sheet path b, further passes through a sheet path c between the platen glass 2 and the belt 10 while sliding on the platen glass 2 from the left to the right-hand side of FIG. 1.

An explanation will now be given of the above-described document reader 40.

The document reader 40 comprises an illumination lamp (light source) 41. In the sequential document-reading mode, the lamp 41 illuminates the surface of the sheet document S having an image formed thereon which is being transferred on the platen glass 2.

The reader 40 also includes reflecting shades 42 which allow light from the lamp 41 to be reflected on the document S, a mirror 43, a lens 44, and an image reading element 45, such as a CCD or the like.

With this construction, in the sequential document-reading mode, the light source 41, the mirror 43 and other components of the image reader 40 are stationed in predetermined positions, that is, at one end of the platen glass 2 on the left-hand side of FIG. 1, as indicated by the solid lines in FIG. 1. The turn belt 10 is turned to allow the sheet document S to pass along the platen glass 2 so that the image reader 40 can perform reading of image information on the document S. The sheet document S whose image has been read by the reader 40 is transferred onto the top surface of the platen glass 2 from the left to the right-hand side of FIG. 1. The document S further passes through a sheet path d, a pair of paper-discharge rollers 14 and a discharge outlet 15 so as to be discharged onto a paper-discharge tray 16 placed between the document tray 15 and the document-feeding turn belt 10.

In a manner described above, the sheet documents S placed on the document tray 5 are sequentially fed one by one onto the platen glass 2 so that the reader 40 can perform reading of an image formed on each of the documents S, which are then sequentially discharged onto the discharge tray 16. The above-described cycle is automatically repeated.

A description will now be given of a case in which a document is a book or the like which cannot be fed from the document tray 5. As shown in FIG. 2, the automatic document feeder 3 is pivoted about a pivot center 54 by an urging force of a spring 52 so as to be opened upward. With this arrangement, a document 53 such as a book or the like with its image facing downward is placed on the platen glass 2, and the illumination lamp 41, the reflecting shades 42 and the lens 43 of the image reader 40 are shifted from a position A indicated by solid lines of FIG. 1 to a position B indicated by one-dot chain lines of FIG. 1 so that the image reader 40 can read an image formed on the document 53.

As is seen from the foregoing description, the document reading device of the present invention performs reading of image information either by allowing the image reader 40 to be stationed in a predetermined position or permitting it to be moved to another position, depending on the type of document.

A detailed description will now be given of measures taken against a temperature rise in the platen glass 2 when the image reader 40 is in a fixed position so as to perform reading of the image information on the sheet document S by means of sequential document-reading.

When the sheet document S is placed on the tray 5, a document size detecting sensor (not shown) detects the width of the document S in the direction perpendicular to the direction in which the document S is transferred.

Based on the information on the width of the document S, the operation of a drive motor 49 illustrated in FIG. 3 is controlled by a controller (not shown).

Referring to FIG. 3, a heat-radiating plate (light-screening plate) 46 is disposed between the illumination lamp 41 and the platen glass 2, as illustrated in FIG. 1. A rack 47 is attached to one end of the plate 46 and is meshed with a pinion gear 48 connected to the end of the output shaft of the drive motor 49. With this construction, the drive motor 49 is driven to allow the pinion gear 48 to be rotated, which further permits the heat-radiating plate 46 to be moved in the direction indicated by the arrow in FIG. 3, i.e., in the direction in which the document is transferred.

The heat-radiating plate 46 is black at least on the surface thereof facing the light source and is formed of an aluminum plate having higher a heat transfer rate. The plate 46 is partially and integrally provided with a plurality of heat radiating fins 50 formed thereon. The plate 46 is also provided with a plurality of notches 51 (portions through which light is permitted to pass and which heat is allowed to be transferred, i.e., the light-transmitting and light-transfer allowing portions) having widths $L_1$, $L_2$ and $L_3$, respectively, which are substantially similar to the widths of the documents S.

With this arrangement, the document size detecting sensor detects the width of the sheet document S, and upon this detection, the drive motor 49 is controlled so that the notch 51 corresponding to the document width is moved onto the illumination lamp 41. With this movement of the notch 51, the platen glass 2 can transmit the light and receive heat from the lamp 41 through the notch 5 by an amount of light and heat which can pass through the width of the document S, that is, the width of the notch 51, so as to reach the document S. The remaining amount of light and heat, other than that applied to the glass 2, is screened by the light-screening plate (heat-transfer inhibiting plate) 46, thereby preventing the platen glass 2 from being overheated.

Since the plate 46 is formed of an aluminum plate having a higher heat transfer rate, the excessive heat of the lamp 41 is temporarily absorbed in the radiating plate 46, and then spreads out to the overall plate 46 and eventually cooled, thereby inhibiting a local temperature increase in the platen glass 2, which would otherwise further bring about cracks on the overheated glass 2.

The heat passed through the notches 51 of the radiating plate 46 reaches a local portion of the platen glass 2 to heat it. However, when the sheet document S passes along the top surface of the local portion of the glass 2, the heat applied to the portion is transferred to the sheet document S, thereby inhibiting a local temperature increase in the platen glass 2.

Second Embodiment

Figure 4:
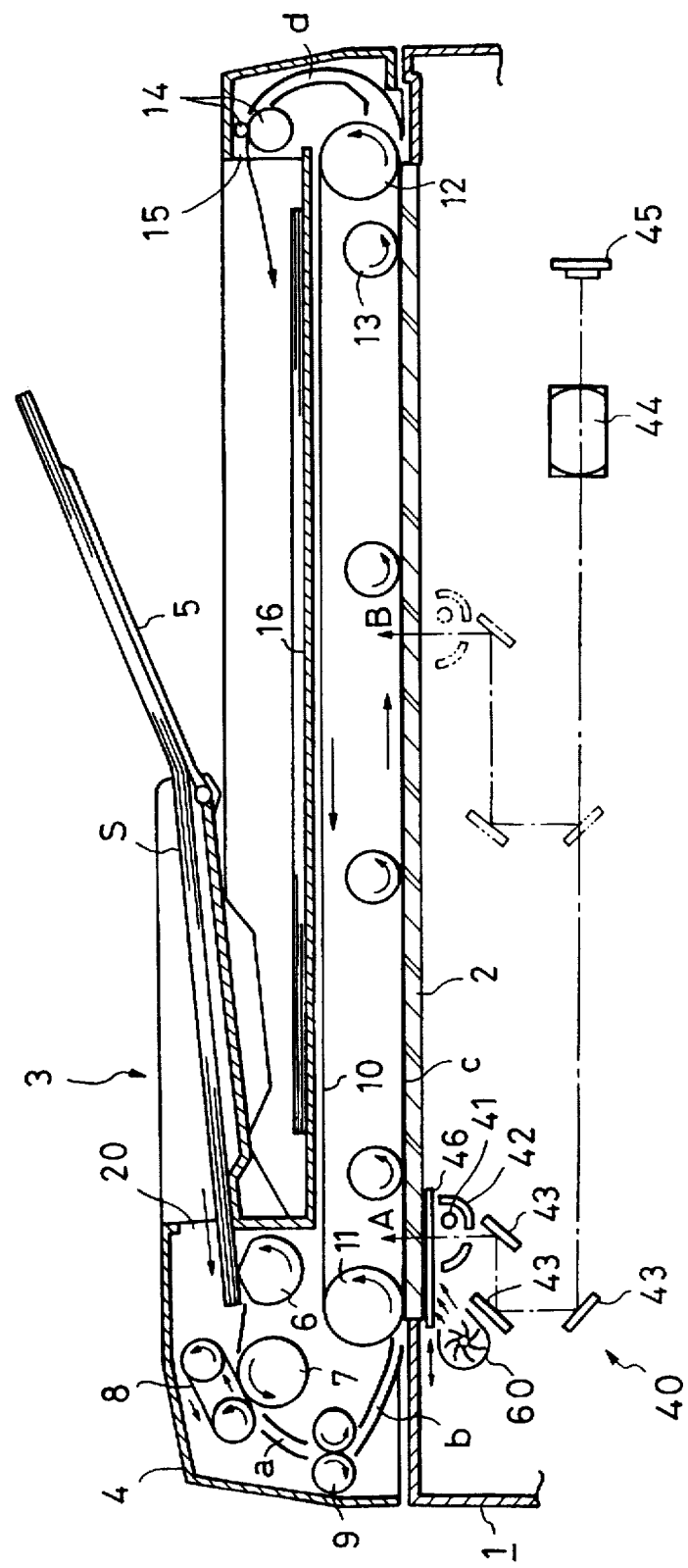
FIG. 4 is a cross sectional view illustrative of the upper portion of an image forming apparatus provided with an image reading device according to a second embodiment of the present invention.

An explanation will further be given of a second embodiment of the present invention with reference to FIG. 4. FIG. 4 is a cross sectional view illustrative of the upper portion of an image forming apparatus provided with an image reading device according to a second embodiment of the present invention. The same elements as those shown in FIG. 1 are designated by like reference numerals, and an explanation thereof will thus be omitted.

In this embodiment, a cooling fan 60 used for cooling the heat-radiating plate 46 is added to the first embodiment.

As shown in FIG. 4, the cooling fan 60 is disposed under the radiating plate 46, and is actuated to blow so as to force the plate 46 to be cooled along the overall width thereof, thereby more effectively preventing a local temperature increase in the platen glass 2.

Third Embodiment

Figure 5:
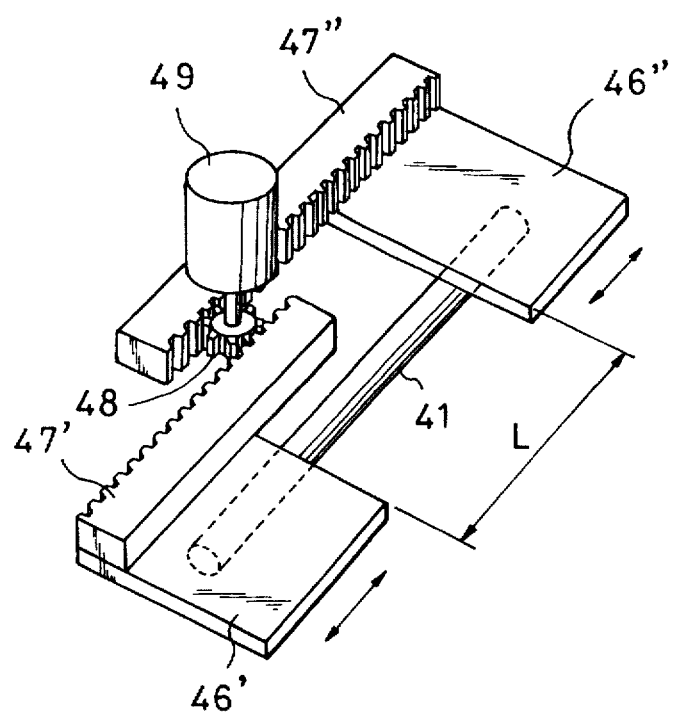
FIG. 5 is a perspective view illustrative of a drive mechanism of a heat-radiating plate for use in an image reading device according to a third embodiment of the present invention.

A third embodiment of the present invention will further be explained with reference to FIG. 5. FIG. 5 is a perspective view illustrative of a drive mechanism of the heat-radiating plate. The same elements as those shown in FIG. 3 are designated by like reference numerals, and an explanation thereof will thus be omitted.

In this embodiment, two heat-radiating plates 46' and 46" are provided for the image reading device, and racks 47' and 47" are attached to the plates 46' and 46", respectively, in such a way that they can opposedly face to each other. A pinion gear 48 connected to the end of the output shaft of the drive motor 49 is meshed with both the racks 47' and 47".

With this arrangement, in a manner similar to the first embodiment, upon detection of the width of the sheet document S by a document size detecting sensor (not shown), the operation of the drive motor 49 is controlled by a controller (not shown). Thus, the racks 47' and 47" meshed with the pinion gear 48 and the radiating plates 46' and 46" are allowed to be close to or away from each other, as indicated by the arrows in FIG. 5, that is, in the direction perpendicular to the direction in which the document is transferred, so that the distance L between the plates 46' and 46" can be adjusted to be substantially similar to the width of the document S. With this adjustment, the plates 46' and 46" can screen the light and heat from the illumination lamp 41, thereby inhibiting a local temperature increase in the platen glass 2.

In a manner described above, in this embodiment, the operation of the drive motor 49 is controlled so that the distance L, i.e., the light-transmitting width (the heat-transfer allowing width) between the radiating plates 46' and 46" can be changed as desired. Hence, this embodiment can effectively apply to documents which do not comply with standard sizes.

As will be clearly understood from the foregoing description, the present invention offers the following advantages.

Only an amount of light and heat from the illumination means which can pass through the width of a document to be read reaches the platen glass, while the remaining amount of light and heat is screened by the light-screening means (heat-transfer inhibiting means), thereby inhibiting a local temperature increase in the platen glass, which would otherwise further bring about danger and cause cracks in the overheated portion of the platen glass.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A document reading device comprising:

a document placing table;

a light source for illuminating a document placed on said document placing table;

a light-screening member for screening light travelling to said document placing table from said light source, said light-screening member being arranged between said light source and said document placing table;

light-screening width control means for changing a width of said light-screening member in accordance with a document size; and document feeding means for feeding the document, wherein said light source illuminates the document which is being fed, and wherein the width of said light-screening member along which the light is screened is changed in a direction perpendicular to the direction in which the document is normally fed.

2. A document reading device according to claim 1, further comprising a cooling fan for cooling said light-screening member.

3. A document reading device according to claim 1, wherein said light source remains stationary while the document is illuminated.

4. A document reading device according to claim 1, being for use in an image forming apparatus which transforms light reflected from the document to an image formed on a photosensitive member so as to visualize the latent image formed on the photosensitive member, and then transfers the visualized image onto a recording medium.

5. A document reading device according to claim 1, further comprising document-size detection means for detecting the document size.

6. A document reading device according to claim 1, wherein said light-screening member comprises a light-screening plate which is movable according to the document size.

7. A document reading device according to claim 6, wherein said light-screening plate comprises a plurality of light-transmitting portions having different dimensions in a direction perpendicular to the direction in which the document is normally fed, and is moved in a direction in which the document is normally fed according to the document size.

8. A document reading device according to claim 6, wherein said light-screening plate is moved in a direction perpendicular to a direction in which the document is normally fed according to the document size.

9. A document reading device according to claim 6, wherein said light-screening plate is black at least on a surface thereof adjacent to said light source.

* * * * *